United States Patent
Le et al.

(10) Patent No.: US 11,869,008 B2
(45) Date of Patent: Jan. 9, 2024

(54) MINIMIZING RISKS POSED TO ONLINE SERVICES

(71) Applicant: Intuit Inc., Mountain View, CA (US)

(72) Inventors: Nghiem Le, Sherman Oaks, CA (US); Leandro Alves, Coral Springs, FL (US); Nikolas Terani, Moorpark, CA (US); Eugene Bendersky, Reseda, CA (US); Taylor Cressy, West Hills, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/515,327

(22) Filed: Oct. 29, 2021

(65) Prior Publication Data

US 2023/0134689 A1    May 4, 2023

(51) Int. Cl.
*G06Q 20/40* (2012.01)
*G06Q 20/24* (2012.01)

(52) U.S. Cl.
CPC ......... *G06Q 20/4016* (2013.01); *G06Q 20/24* (2013.01)

(58) Field of Classification Search
None
See application file for complete search history.

(56) References Cited

U.S. PATENT DOCUMENTS

| | | | |
|---|---|---|---|
| 8,857,710 B1 | 10/2014 | Kowalchyk et al. | |
| 9,406,032 B2 * | 8/2016 | Salonen | G06Q 10/109 |
| 9,786,015 B1 | 10/2017 | Roumeliotis | |
| 10,223,745 B1 | 3/2019 | Randhawa et al. | |
| 11,055,772 B1 | 7/2021 | Ram et al. | |
| 11,087,309 B2 | 8/2021 | Hayman et al. | |
| 2006/0059073 A1 * | 3/2006 | Walzak | G06Q 40/03 705/38 |
| 2008/0272188 A1 * | 11/2008 | Keithley | G06Q 30/06 235/379 |
| 2011/0302084 A1 * | 12/2011 | Melik-Aslanian | G06Q 20/3555 705/44 |
| 2015/0278948 A1 * | 10/2015 | Don | G06Q 40/03 705/38 |
| 2018/0040064 A1 * | 2/2018 | Grigg | H04L 41/145 |
| 2020/0320536 A1 * | 10/2020 | Clower | G06Q 20/4016 |
| 2020/0357051 A1 * | 11/2020 | Hunt | G06Q 20/20 |

* cited by examiner

*Primary Examiner* — Kirsten S Apple
*Assistant Examiner* — Matthew Cobb
(74) *Attorney, Agent, or Firm* — Paradice & Li LLP

(57) ABSTRACT

A system receives a request for payment of a transaction between a vendor and a consumer, and sends a first request to a database associated with the online service for historical transactions and personal attributes of the vendor concurrently with sending a second request to a number of third-party services for credit information and personal attributes of the consumer. The system receives information responsive to the first and second requests from the database and the third-party services, respectively, and obtains a risk score for the transaction based on an application of one or more risk assessment rules to the received information by a machine learning model trained with at least the historical transactions and the personal attributes of the vendor. In some aspects, the system determines whether to advance funds to the vendor, prior to requesting payment from a consumer account, based at least in part on the risk score.

17 Claims, 8 Drawing Sheets

MINIMIZING RISKS POSED TO ONLINE SERVICES

TECHNICAL FIELD

This disclosure relates generally to determining risks associated with electronic payments, and more specifically, to assessing risks of financial transactions in real-time to minimize fraud associated with electronic payments.

DESCRIPTION OF RELATED ART

Many vendors, small businesses, and other entities outsource their payment processing operations to an electronic or online service (such as Quickbooks Online®) to reduce overhead and increase operational efficiencies. For example, during a transaction in which a consumer buys goods or services from a vendor, the consumer may provide a credit card, debit card, or banking information to the vendor for payment of the goods or services. The vendor may enter the payment information into a transaction terminal, which sends the transaction data to the online service. The online service serves as an intermediary between the consumer and an issuer or bank designated by the consumer, and sends the transaction data to the designated bank. The bank processes the transaction based on the transaction data, for example, by transferring funds equal to the transaction amount from the designated bank to an account associated with the vendor. The online service may confirm the transfer of funds, and then send confirmation of the completed transaction to the vendor.

Although many such transactions are successfully completed each day, fraudulent transactions have become more common. For example, when a consumer returns items purchased from a vendor via an online service, the online service may refund the consumer's payment in a chargeback transaction prior to receiving reimbursement of the chargeback amount from the vendor. If the vendor does not reimburse the online service for the chargeback amount, the online service may incur a financial loss corresponding to the chargeback amount. Accordingly, it is desirable to assess risks posed to the online service by transactions submitted for processing so that the online service's expose to financial risk can be minimized. Moreover, it is desirable to reduce the risks posed to vendors by fraudulent consumers that, for example, may use stolen or falsified credit cards to purchase goods and services from the vendors (who may be legitimate). In this case, when the credit card issuer files chargebacks for transactions they did not authorize, the vendors are typically responsible for the chargeback amounts, irrespective of whether the vendors are able to collect from the consumers. Therefore, there is a need for risk assessment for all transactions processed by an online service in order to protect both the vendors and the online service.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods and devices of this disclosure each have several innovative aspects, no single one of which is solely responsible for the desirable features disclosed herein.

One innovative aspect of the subject matter described in this disclosure can be implemented as a method for selectively advancing funds based on risks posed by transactions associated with an online service. The method can be performed by one or more processors of a system coupled to or associated with the online service, and can include receiving a payment request for a transaction between a vendor and a consumer, and sending a first request to a database associated with the online service for historical transactions and personal attributes of the vendor concurrently with sending a second request to a number of third-party services for credit information and personal attributes of the consumer. The method includes receiving information responsive to the first and second requests from the database and the third-party services, respectively. The method includes obtaining a risk score for the transaction based on an application of one or more risk assessment rules to the received information by a machine learning model trained with at least the historical transactions and the personal attributes of the vendor. The method includes determining whether or not to advance funds to the vendor for the transaction, prior to sending a payment request to a financial service designated by the consumer, based at least in part on the risk score. In some instances, the machine learning model can also be trained using the credit information of the vendor and/or the consumer.

In some implementations, the method may also include declining the transaction without sending the payment request to the designated financial service when the risk score is greater than a first level, and informing the designated financial service of the declined transaction when the risk score is greater than the first level by more than an amount or percentage. The method may also include sending the payment request to the designated financial service when the risk score is less than a second level, where the first level is greater than the second level, and advancing funds for the transaction to the vendor prior to or concurrently with sending the payment request to the designated financial service when the risk score is less than the second level by more than an amount or percentage.

In some other implementations, the method may also include receiving account information of the designated financial service, sending the account information to a selected third-party service, and receiving, from the selected third-party service, an indication of whether or not the account information of the designated financial service is valid. In some instances, the designated financial service is a bank, and the account information includes an account number and routing number of the bank. In some other instances, the designated financial service is a credit card company, and the account information includes an account number, an expiration date, and a security code of the credit card. In some aspects, determining whether or not to advance the funds to the vendor includes advancing the funds to the vendor prior to sending the payment request to the designated financial service when the account information is valid, and declining the transaction and reporting the consumer to at least the designated financial service when the account information is invalid.

The personal attributes of the consumer may include a phone number of the consumer, an email address of the consumer, a mailing address of the consumer, or any combination thereof. The personal attributes of the vendor may include a phone number of the vendor, an email address of the vendor, a mailing address of the vendor, a device ID of a transaction terminal associated with the vendor, a type of browser used by the vendor to access the electronic system, or any combination thereof.

In some other implementations, the method may also include determining a correlation between the personal attributes of the consumer and the personal attributes of the vendor, and determining a likelihood of fraudulent activity (e.g., collusion) involving the vendor and the consumer based at least in part on the determined correlation. In some aspects, the method may also include disabling the vendor's account with the online service when the likelihood of fraudulent activity involving the vendor and the consumer is greater than a threshold. In some instances, the correlation is based at least in part on commonalities between the phone numbers of the vendor and the consumer, commonalities between email addresses of the vendor and the consumer, commonalities between the mailing addresses of the vendor and the consumer, or any combination thereof. Once this is detected, the vendor is reported to proper authorities and/or one or more of the financial services (such as credit card associations).

The credit information of the consumer may include a credit score of the consumer, a credit history of the consumer, an amount of credit available to the consumer, a length of credit history of the consumer, credit defaults associated with the consumer, bankruptcy of the consumer, a number of missed or insufficient payments by the consumer during the time period, or any combination thereof. The credit information of the vendor may include a credit score of the vendor, a credit history of the vendor, an amount of credit available to the vendor, a number of chargebacks during a time period, a dollar amount of each chargeback during the time period, an average time period between the chargebacks during the time period, a number of credit card authorization declines associated with the vendor during the time period, or any combination thereof.

In various implementations, the historical transactions and personal attributes of the vendor can be aggregated with the credit information and personal attributes of the consumer into a structured data set, and the structured data set can be provided as the received information to the machine learning model. In some implementations, the method may also include combining a plurality of structured data sets corresponding to a plurality of transactions into a single thread, and concurrently obtaining a risk score for each of the plurality of transactions based on the application of the one or more risk assessment rules to the single thread by the trained machine learning model. In some instances, the plurality of transactions may correspond to the same vendor and consumer. In other instances, the plurality of transactions may correspond to the same vendor and different consumers. In some other instances, the plurality of transactions may correspond to different vendors. The ability to obtain risk scores for a plurality of transactions at the same time can increase the throughput of the system, for example, as compared with implementations in which the system generates each risk score individually.

Another innovative aspect of the subject matter described in this disclosure can be implemented in a system for selectively advancing funds based on risks posed by transactions associated with an online service. In some implementations, the system is associated with the online service and includes one or more processors and a memory coupled to the one or more processors. The memory can store instructions that, when executed by the one or more processors, cause the system to receive a request for payment of a transaction between a vendor and a consumer, and to send a first request to a database associated with the online service for historical transactions and personal attributes of the vendor concurrently with sending a second request to a number of third-party services for credit information and personal attributes of the consumer. Execution of the instructions causes the system to receive information responsive to the first and second requests from the database and the third-party services, respectively. Execution of the instructions causes the system to obtain a risk score for the transaction based on an application of one or more risk assessment rules to the received information by a machine learning model trained with at least the historical transactions and the personal attributes of the vendor. Execution of the instructions causes the system to determine whether or not to advance funds to the vendor for the transaction, prior to sending a payment request to a financial service designated by the consumer, based at least in part on the risk score. In some instances, the machine learning model can also be trained using the credit information of the vendor and/or the consumer.

In some implementations, execution of the instructions may also cause the system to decline the transaction without sending the payment request to the designated financial service when the risk score is greater than a first level, and to inform the designated financial service of the declined transaction when the risk score is greater than the first level by more than an amount or percentage. Execution of the instructions also causes the system to send the payment request to the designated financial service when the risk score is less than a second level, where the first level is greater than the second level, and to advance funds for the transaction to the vendor prior to or concurrently with sending the payment request to the designated financial service when the risk score is less than the second level by more than an amount or percentage.

In some other implementations, execution of the instructions also causes the system to receive account information of the designated financial service, to send the account information to a selected third-party service, and to receive, from the selected third-party service, an indication of whether or not the account information of the designated financial service is valid. In some instances, the designated financial service is a bank, and the account information includes an account number and routing number of the bank. In some other instances, the designated financial service is a credit card company, and the account information includes an account number, an expiration date, and a security code of the credit card. In some aspects, determining whether or not to advance the funds to the vendor includes advancing the funds to the vendor prior to sending the payment request to the designated financial service when the account information is valid, and declining the transaction and reporting the consumer to at least the designated financial service when the account information is invalid.

The personal attributes of the consumer may include a phone number of the consumer, an email address of the consumer, a mailing address of the consumer, or any combination thereof. The personal attributes of the vendor may include a phone number of the vendor, an email address of the vendor, a mailing address of the vendor, a device ID of a transaction terminal associated with the vendor, a type of browser used by the vendor to access the electronic system, or any combination thereof.

In some other implementations, execution of the instructions also causes the system to determine a correlation between the personal attributes of the consumer and the personal attributes of the vendor, and to determine a likelihood of fraudulent activity involving the vendor and the consumer based at least in part on the determined correlation. In some aspects, execution of the instructions also causes the system to disable the vendor's account with the online service when the likelihood of fraudulent activity involving the vendor and the consumer is greater than a threshold. In some instances, the correlation is based at least in part on commonalities between the phone numbers of the vendor and the consumer, commonalities between email addresses of the vendor and the consumer, commonalities between the mailing addresses of the vendor and the consumer, or any combination thereof.

The credit information of the consumer may include a credit score of the consumer, a credit history of the consumer, an amount of credit available to the consumer, a length of credit history of the consumer, credit defaults associated with the consumer, bankruptcy of the consumer, a number of missed or insufficient payments by the consumer during the time period, or any combination thereof. The credit information of the vendor may include a credit score of the vendor, a credit history of the vendor, an amount of credit available to the vendor, a number of chargebacks during a time period, a dollar amount of each chargeback during the time period, an average time period between the chargebacks during the time period, a number of credit card authorization declines associated with the vendor during the time period, or any combination thereof.

In various implementations, the historical transactions and personal attributes of the vendor can be aggregated with the credit information and personal attributes of the consumer into a structured data set, and the structured data set can be provided as the received information to the machine learning model. In some implementations, execution of the instructions also causes the system to combine a plurality of structured data sets corresponding to a plurality of transactions into a single thread, and to concurrently obtain a risk score for each of the plurality of transactions based on the application of the one or more risk assessment rules to the single thread by the trained machine learning model. In some instances, the plurality of transactions may correspond to the same vendor and consumer. In other instances, the plurality of transactions may correspond to the same vendor and different consumers. In some other instances, the plurality of transactions may correspond to different vendors. The ability to obtain risk scores for a plurality of transactions at the same time can increase the throughput of the system, for example, as compared with implementations in which the system generates each risk score individually.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
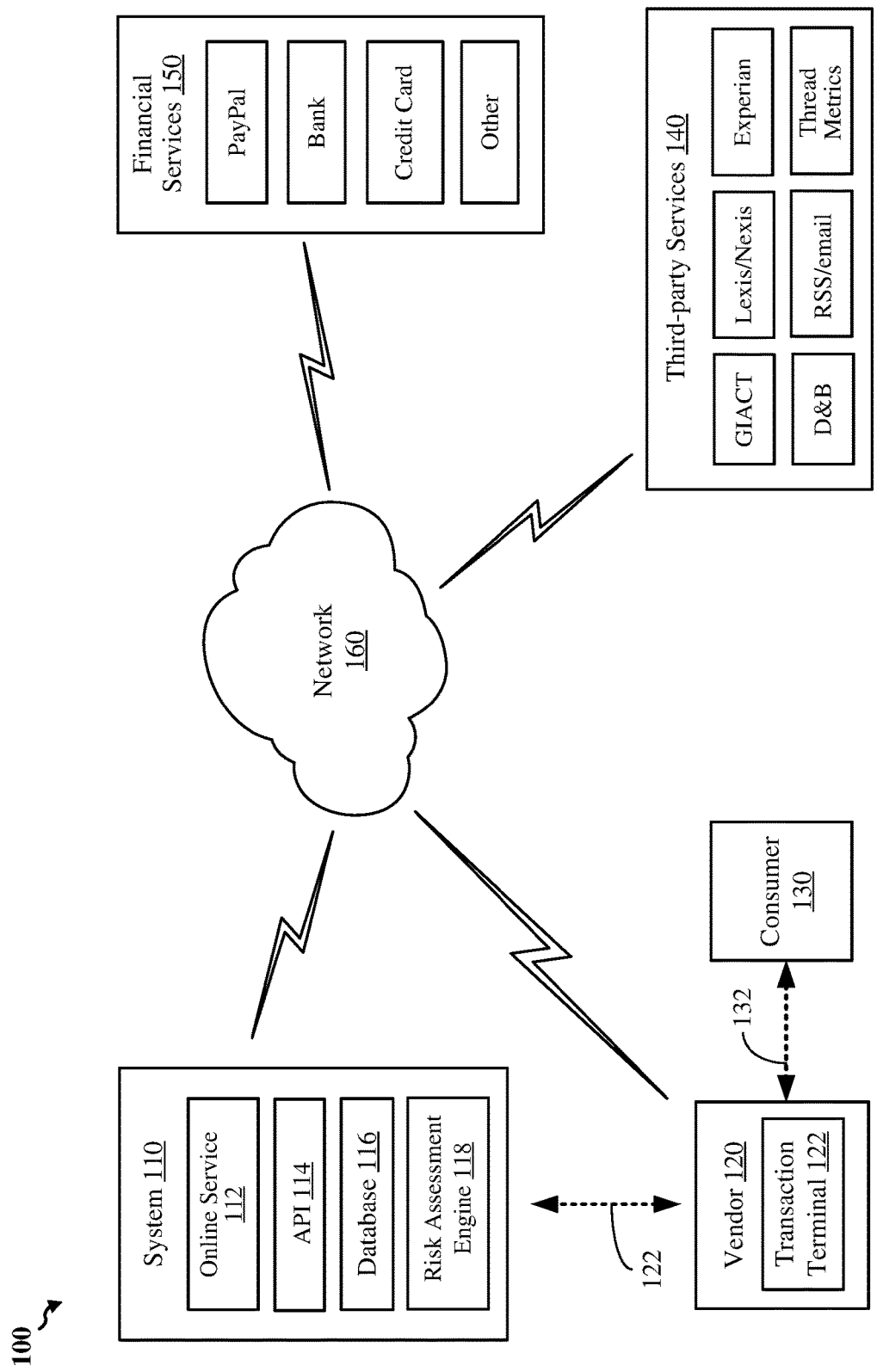
FIG. 1 shows a block diagram of an environment within which various aspects of the subject matter disclosed herein can be implemented.

Implementations of the subject matter described in this disclosure can be used to assess risks posed by transactions associated with an online or electronic payment service, which is hereinafter referred to as the "online service." As discussed, while millions of financial transactions are processed electronically each day using online services that can electronically communicate and exchange funds with various financial services or institutions, fraudulent transactions and fraudulent activities associated with such online services have become more common. Despite the deployment of increasingly sophisticated fraud detection systems by these online services, as well as by various financial services and financial institutions, fraudsters continue to devise new ways to avoid them.

Collusion between vendors and consumers associated with electronically processed transactions is also commonplace, and can pose significant risks to these online services. Online services offering instant payment or funding solutions are especially vulnerable to these risks. For example, some online services advance funds to a vendor for payment of a transaction before collecting payment from the consumer. The vendor and consumer can collude with each other to defraud the online service by submitting a fraudulent transaction to the online service for processing, receiving the advance payment provided by the online service, and then either canceling the transaction or closing the bank account or credit card submitted with the fraudulent transaction. Specifically, the consumer can "return" the supposedly purchased items to the vendor, and then receive a refund from the online service, before the online service retrieves the advance payment made to the vendor, in a chargeback transaction. When the online service is unable to retrieve the advance payment from the vendor, the online service typically bears the financial loss associated with the chargeback transaction.

In accordance with various aspects of the present disclosure, a system is disclosed that can selectively advance funds based on risks posed by transactions associated with an online service. In some implementations, the system receives a request for payment of a transaction between a vendor and a consumer, and obtains historical transactions and personal attributes of the vendor from an associated database while concurrently obtaining credit information and personal attributes of the consumer from one or more third-party services. The historical transactions and personal attributes of the vendor are aggregated with the credit information and personal attributes of the consumer into a structured data set. The system determines a risk score for the transaction based on an application of one or more risk assessment rules to the structured data set by a machine learning model. The machine learning model can be trained with at least the historical transactions and the personal attributes of the vendor. In some instances, the machine learning model can also be trained using credit information of the vendor and/or the consumer. The system then determines whether or not to advance funds to the vendor for the transaction, prior to sending the request to a financial service designated by the consumer, based at least in part on the risk score.

In some implementations, the system declines the transaction without sending a payment request to the designated financial service when the risk score is greater than a first level, and sends the payment request to the designated financial service when the risk score is less than a second level, where the first level is greater than the second level. In some instances, the system may advance funds for the transaction to the vendor prior to or concurrently with sending the payment request to the designated financial service when the risk score is less than the first level by more than an amount or percentage, thereby allowing the vendor to be paid almost immediately (e.g., without having to wait for approval or authorization from the designated financial service). Further, the system may inform the designated financial service of vendors with the declined transaction when the risk score is greater than the first level by more than an amount or percentage, which in turn may improve the ability of the designated financial service to detect fraudulent transactions and vendors.

Various implementations of the subject matter disclosed herein provide one or more technical solutions to the technical problem of selectively advancing funds based on risks posed by transactions associated with an online service. As discussed, a machine learning model trained using historical information of the vendor and personal attributes of the vendor and consumer can generate a risk score for the transaction by applying one or more risk assessment rules to a structured data set containing the historical transactions of the vendor, personal attributes of the vendor, credit information of the consumer and the personal attributes of the consumer. The risk score may indicate a level of financial risk posed to the online service by the transaction, and may be used to not only determine whether to process the transaction but also to determine whether or not to advance funds to the vendor for payment of the transaction prior to requesting payment from the consumer's bank account or credit card. By advancing funds to vendors only for transactions that pose less than a certain risk to the online service, implementations of the subject matter disclosed herein can minimize the number and amount of fraudulent chargeback transactions associated with the online service. In some aspects, the system can also determine a likelihood of fraudulent activity involving a vendor and consumer by determining a correlation between the personal attributes of the consumer and the personal attributes of the vendor, and then determining the likelihood of fraudulent activity based at least in part on the determined correlation.

As such, various aspects of the present disclosure provide a unique computing solution to a unique computing problem that did not exist prior to online services that can concurrently process a plurality of financial transactions on behalf of a multitude of different vendors in a matter of minutes or even seconds. More specifically, the problem of assessing financial risks posed to an online service by vendors and/or their consumers did not exist prior to the widespread adoption of the Internet as a communications medium over which vast numbers of financial transactions and other electronic exchanges of data can be facilitated, and is therefore a problem rooted in and created by technological advances that made the Internet a necessity for vendors and consumers alike to process financial transactions electronically.

In the following description, numerous specific details are set forth such as examples of specific components, circuits, and processes to provide a thorough understanding of the present disclosure. The term "coupled" as used herein means connected directly to or connected through one or more intervening components or circuits. The terms "processing system" and "processing device" may be used interchangeably to refer to any system capable of electronically processing information. As used herein, credit cards, debit cards, and gift cards may be collectively referred to as "payment cards." As used herein, an entity may refer to an individual, a business, or any other organization. The examples herein depict small businesses as entities for clarity in explaining aspects of the present disclosure, but any suitable entity may be used. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

FIG. 1 shows an environment 100 within which aspects of the present disclosure can be implemented. The environment 100 is shown to include a risk management system 110, vendors 120 in communication with the system 110 via transaction terminals 122, consumers 130 in communication with the vendors 120 either in person or via communication links 132, one or more third-party services 140, one or more financial services 150, and a communications network 160. Although not shown for simplicity, the environment 100 may include other components, devices, or systems not shown for simplicity. As described herein, the system 110 can assess risks posed to online payment systems and platforms by the transactions, as well as the parties to the transactions, processed by such online payment systems and platforms. The system 110 can also The system 110 may include or may be associated with any number of computing devices and processing resources such as (but not limited to) servers that can be implemented in a single location or distributed across multiple locations. The servers may be of various types such as, for example, a web server, a news server, a file server, an application server, a database server, a proxy server, or any other server suitable for performing functions or processes described herein. The system 110 may include hardware, software, or embedded logic components or a combination of two or more such components for performing the various functions and operations described herein. In some aspects, the system 110 may send commands, instructions, or data to the vendors 120, the third-party services 140, and/or the financial services 150 via the communications network 160.

As shown, the system 110 includes an online service 112, an application program interface (API) 114, a database 116, and a risk assessment engine 118. The online service 112 may include or manage an accounting software application, a tax preparation software application, a personal finance software application, a payroll software application, or any combination thereof. In some implementations, vendors 120 can establish accounts with the online service 112 to manage their commercial, financial, and tax-related transactions in a manner that reduces overhead and increase operational efficiencies. For example, during a transaction in which a consumer 130 buys goods or services from a vendor 120, the consumer 130 may provide a credit card, debit card, or banking information to the vendor 120 for payment of the goods or services. The vendor 120 may enter the payment information into the transaction terminal 122, which sends the transaction data to the online service 112. The online service 112 serves as an intermediary between the consumer 130 and a financial service 150 designated by the consumer 130, and sends the transaction data to the designated financial service 150. If the transaction data indicates a valid transaction, the designated financial service 150 may process the transaction, for example, by transferring funds equal to the transaction amount to the online service 112. The online service 112 may confirm the transfer of funds, and send a payment confirmation to the vendor 120. In some instances, accounts associated with the vendors 120 can be opened, managed, suspended, or terminated by the system 110. Although the online service 112 is depicted in FIG. 1 as part of the system 110, in some other implementations, the online service 112 may be separate and distinct from the system 110. In some aspects, the online service 112 may be remotely located relative to the system 110.

The API 114 provides an interface between the system 110 and other components or systems of the environment 100 including (but not limited to) the vendors 120, the consumers 130, the third-party services 140, and the financial services 150. For example, when a vendor 120 sells goods or services to a consumer 130, the vendor 120 can send the transaction data to the online service 112 via the API 114 for processing. The transaction data can include any information relevant to processing the transaction between the vendor 120 and consumer 130. In some implementations, the transaction data may include (but is not limited to) a transaction ID, an amount of the transaction, and payment information provided or designated by the consumer 130. The payment information includes information necessary to facilitate the transfer of funds from an entity associated with the consumer 130 to an entity associated with the vendor 120. For example, when the consumer 130 pays for the purchased goods or services via payment card, the payment information can include the account number, expiration date, security code, and/or PIN of the payment card. For another example, when the consumer 130 pays for the purchased goods or services via ACH, the payment information can indicate a bank designated by the consumer 130, the routing number of the designated bank, the account number of the consumer's account at the designated bank, and/or the type of bank account (e.g., checking or savings).

The API 114 receives the transaction data, extracts or parses the payment information from the transaction data, and forwards the payment information to the online service 112. The online service 112 can use the payment information to contact the designated financial service 150 and request payment of the transaction amount. Thus, for example, when the consumer 130 pays via payment card, the online service 112 can send the account number, expiration date, security code, and/or PIN of the payment card to the appropriate financial service 150. For another example, when the consumer 130 pays via ACH, the online service 112 can send the routing number, the bank account number, and the type of account to the appropriate financial service 150. In some implementations, the API 114 also forwards the transaction data to the risk assessment engine 118, which as described below can assess risks posed to the online service 112 by the transaction, and can generate a risk score indicative of the level of risk posed to the online service 112 by the transaction. In some aspects, the API 114 informs the online service 112 that any transmission of payment requests to the financial services 150 may be dependent on the corresponding risk score generated by the risk assessment engine 118.

In some implementations, the API 114 provides a programmatic interface that allows the online service 112 to communicate with the financial services 150 via the communications network 160, and allows the risk assessment engine 118 to communicate with the third-party services 140 and the financial services 150 via the communications network 160. In some aspects, the programmatic interface of the API 114 may provide an interface between various components within the system 110. For example, in some instances, the programmatic interface of the API 114 may allow the online service 112 to communicate with the database 116 and the risk assessment engine 118. In one implementation, the programmatic interface of the API 114 can implement one or more portals through which components of the system 110 can communicate with one or more external devices, systems, or services (such as the vendors 120, the third-party services 140, and the financial services 150).

In some implementations, the API 114 can query the system database 116, one or more of the third-party services 140, and/or one or more of the financial services 150 for information related to vendors 120 and/or consumers 130. For example, as described in more detail below, the risk assessment engine 118 can instruct the API 114 to send a first request to the database 116 for historical transactions and personal attributes of the vendor 120, and can instruct the API 114 to send a second request to the third-party services 140 for credit information and personal attributes of the consumer 130. In some aspects, the risk assessment engine 118 can instruct the API 114 to query the financial services 150 for payment information associated with the consumer 130. In some instances, the API 114 can query the third-party services 140 for credit information and personal attributes of the vendor 120.

The database 116 can be any suitable database capable of storing information about or relating to the vendors 120, to the merchant terminals 122, to the consumers 130, to purchases or transactions between the vendors 120 and consumers 130, and to communications between the vendors 120 and consumers 130. In some implementations, the database 116 can be a relational database capable of manipulating any number of various data sets using relational operators, and present one or more data sets and/or manipulations of the data sets to a user in tabular form. In some instances, the database 116 can also use Structured Query Language (SQL) for querying and maintaining the database, and information stored in the database 116 can be arranged in tabular form, either collectively in a feature table or individually within each of the data sets.

In various implementations, the database 116 stores historical transactions and personal attributes of the vendors 120. For example, in some instances, completed transactions processed by the online service 112 for each vendor 120 can be stored in the database 116, along with any corresponding risk scores generated by the risk assessment engine 118, as historical transactions. The personal attributes of a vendor 120 can include (but are not limited to) the phone number of the vendor, the email address of the vendor, the mailing address of the vendor, the device ID of the transaction terminal 122, and the type of browser used by the vendor 120 to access the online service 112. The vendor's personal attributes can be obtained from any suitable source including (but not limited to) the vendor's account with the online service 112, historical transactions stored in the database 116 involving the vendor 120, active sessions between the vendor 120 and the online service 112, and/or attempted logins to the online service 112. For example, the system 110 can obtain some personal attributes, such as the vendor's email address, mailing address, and phone number from the vendor's account information with the online service 112. For another example, when the vendor 120 initiates a session with the online service 112 using a computing device (such as the transaction terminal 122), the system 110 can determine the device ID, the type of browser, and the type of operating system used by the vendor 120 to initiate the session. In some aspects, some or all of the personal attributes of a vendor 120 can be obtained from one or more of the third-party services 140.

The database 116 can also store information relating to the vendor's customers, the vendor's banking information, the vendor's credit information, the vendor's tax information, or any combination thereof. In some implementations, the database 116 stores personal attributes of consumers 130. The personal attributes of a consumer 130 can include (but are not limited to) the phone number of the consumer 130, the email address of the consumer 130, and the mailing address of the consumer 130. The consumer's personal attributes can be obtained from any suitable source including (but not limited to) historical transactions involving the consumer 130, one or more of the third-party services 140, or one or more of the financial services 150.

The risk assessment engine 118 can be used to assess risks posed to the online service 112 by a transaction between a vendor 120 and a consumer 130 in real-time. Example risks posed by such transactions include (but are not limited to) financial risks and risks of fraudulent activity. The risk assessment engine 118 can obtain the historical transactions of the vendor 120, the personal attributes of the vendor 120, and at least some personal attributes of the consumer 130 from the database 116. The risk assessment engine 118 can obtain credit information of the vendor 120, credit information of the consumer 130, and personal attributes of the consumer 130 from one or more of the third-party services 140. In some aspects, the credit information of the vendor 120 and/or the consumer 130, as well as the personal attributes of the consumer 130, can be stored in the database 116.

The risk assessment engine 118 can transform, or otherwise process, information received from the database 116, the third-party services 140, and the financial services 150 into predictive models that can identify various risks posed by the vendor 120 and generate a risk score indicative of a level of financial risk posed to the online service 112 by the transaction. In some instances, information about the vendor 120 and the consumer 130 obtained from the database 116, the third-party services 140, and/or the financial services 150 is provided to the risk assessment engine 118 as a set of features, and the risk assessment engine 118 uses a machine learning model to determine the risk score for the transaction based on the set of features. In other instances, the obtained information about the vendor 120 and the consumer 130 is aggregated into a structured data set, and the machine learning model generates the risk score by applying one or more risk assessment rules to the structured data set.

In some implementations, the risk assessment engine 118 determines a risk score for the transaction based on the historical transactions of the vendor 120, personal attributes of the vendor 120, credit information of the vendor 120, personal attributes of the consumer 130, credit information of the consumer 130, or any combination thereof. In other implementations, the risk assessment engine 118 determines the risk score for the transaction based on the historical transactions of the vendor 120, the personal attributes of the vendor 120, the credit information of the consumer 130, and the personal attributes of the consumer 130.

In accordance with various aspects of the present disclosure, the risk score is used to determine whether or not to advance funds to the vendor 120 for the transaction prior to sending a corresponding payment request to the financial service 150 designated by the consumer 130. For example, when the risk score is greater than a first value indicative of an unacceptable level of risk, the risk assessment engine 118 instructs the online service 112 to decline the transaction on behalf of the vendor 120. In some instances, the risk assessment engine 118 can also inform the designated financial service 150 of the declined transaction when the risk score is greater than the first value. Conversely, when the risk score is less than a second value indicative of an acceptable level of risk, the risk assessment engine 118 sends the payment request to the designated financial service 150 for processing. In some instances, the risk assessment engine 118 also instructs the online service 112 to advance funds to the vendor 120 for the transaction prior to or concurrently with sending the payment request to the designated financial service 150 when the risk score is less than the second value. In this way, the vendor 120 receives payment for the transaction amount almost immediately from the online service 112.

The vendors 120 can be any suitable individuals, businesses, or entities for which financial transactions and other information exchanges can be processed by the online service 112. For example, in some instances, the vendors 120 can be traditional brick-and-mortar businesses, online-only businesses, or hybrid businesses having one or more physical locations and an online presence. In other instances, the vendors 120 can be mobile merchants that have neither a physical store-front nor an online presence, for example, such as growers that sell fruit and produce at various farmers' markets. In some implementations, only vendors 120 enrolled in and having an active account with the online service 112 are permitted to use the online service 112 for processing payments and other transactions. In this way, the online service 112 can obtain the personal attributes of the vendors 120 during enrollment, and can also receive any updates to the vendors' 120 personal attributes as part of a service agreement between the vendors 120 and the online service 112.

The transaction terminal 122 can be any suitable device capable of transmitting information to and receiving information from the online service 112 via the communications network 160. In some instances, the transaction terminal 122 may be a point-of-sale (POS) terminal. In other instances, the transaction terminal 122 may be a computer, laptop, tablet computer, smartphone, or other communications device capable of executing a generic browser application through which the vendor 120 can initiate an electronic transaction for payment of goods or services purchased by the consumer 130. In some aspects, the vendor 120 can use the generic browser operating on the transaction terminal 122 to access the online service 112, upload transaction data associated with the customer purchase, and use the online service 112 to process payment for the purchase from a financial service 150 designated by the consumer 130. For example, the vendor 120 can use the generic browser operating on the transaction terminal 122 to access Quickbooks Online, which can parse the transaction information received from the vendor 120 and send a payment to the designated financial service 150. The transaction terminal 122 can also receive a notification indicating whether the payment process is complete (or that the transaction was declined).

A consumer 130 can communicate and interact with a vendor 120 either in-person, over a communication link 132 between the vendor 120 and the consumer 130, or over the communications network 160. In some instances, the consumer 130 can interact with the vendor 120 in person. In other instances, the consumer 130 can interact with the vendor 120 using a computer, a smartphone, a tablet computer, or other suitable client device (client device not shown for simplicity).

The third-party services 140 include a plurality of third-party providers of credit scores, credit history, banking information, bankruptcy information, real estate information, personal attributes, and/or other personal information associated with individuals, groups, businesses, agencies, and other entities that participate in, or could participate in, transactions of the type handled by the online service 112. For example, in some implementations, the third-party services 140 may include entities such as GIACT, LexisNexis, Experian, Dunn & Bradstreet (D&B), RSS/email monitoring services, and ThreadMetrics, as depicted in the example of FIG. 1. In other implementations, the third-party services 140 may include other services not shown in FIG. 1, may not include one or more of the services shown in FIG. 1, or both. As known, GIACT is a service that can be used to determine, nearly instantly, whether account information provided by a vendor 120 or consumer 130 identifies a valid account at one of the financial services 140, and if so, the amount of funds or credit available in the account. For example, the risk assessment engine 118 can send the account number and routing number of a bank designated by a consumer 130 to GIACT, and GIACT can determine whether the account number and routing number pair provided by the consumer 130 is a valid combination (e.g., corresponds to a valid account at the designated bank.

LexisNexis can be used to obtain legal information, business information, demographic information, and socioeconomic information of vendors 120 and consumers 130. Experian can be used to obtain credit scores, credit reports, credit histories, credit delinquencies, and other credit information about vendors 120 and consumers 130. Dunn & Bradstreet (D&B) can be used to obtain legal information, business information, demographic information, and socioeconomic information of vendors 120 and consumers 130. ThreadMetrics can be used to obtain physical and online identifiers of vendors 120 and consumers 130. For example, these identifiers may include (but are not limited to) phone numbers, email addresses, mailing addresses, IP addresses, device IDs, browser types, and operating system types associated with vendors 120 and/or consumers 130.

The financial services 150 include any number of banks (e.g., Wells Fargo, Bank of America, Chase, and so on), credit card companies (e.g., American Express, Visa, Mastercard, and so on), online payment platforms (e.g., PayPal, Apple Pay, Square, and so on), and other financial institutions at which the consumers 130 have established accounts. The online service 112 can exchange information with one or more of the financial services 150 using the programmatic interface of the API 114. For example, the online service 112 can send a payment request to Wells Fargo to initiate an ACH transfer of funds from a consumer's account to the online service 112 to pay for purchases made by the consumer 130. Assuming the consumer's account has sufficient funds, Wells Fargo transfers funds for the purchase amount from the consumer's account to the online service 112. In some aspects, the risk assessment engine 118 can also use the programmatic interface of the API 114 to communicate and exchange information with the financial services 150.

The communications network 160 provides communication links between the system 110, the vendors 120, the consumers 130, the third-party services 140, and the financial services 150. In some aspects, the consumers 130 can communicate and interact with the vendors 120 over the network 160 using a client device (not shown for simplicity). The client device can be any suitable computing device such as, for example, a desktop computer, a laptop computer, a personal digital assistant, a cellular telephone, a smartphone, a tablet computer, a game console, an electronic book reader, or another suitable communications device with which the consumers 130 can purchase goods and/or services from the vendors 120 associated with the system 110. The network 160 may be any suitable one or more communication networks including, for example, the Internet, a wide area network (WAN), a metropolitan area network (MAN), a wireless local area network (WLAN), a personal area network (PAN), a radio access network (RAN) such as a Fifth Generation (5G) New Radio (NR) system, a wired network, a cable network, a satellite network, or other suitable network. In some implementations, one or more vendors 120 can communicate with an edge server or other server in a communications network (such as but not limited to an LTE communications network, a 5G NR communications network, a WLAN, a MAN, a WAN, a PAN, a mesh network, or the Internet) to receive mapping information, traffic information, event information, venue information, and so on.

Figure 2:
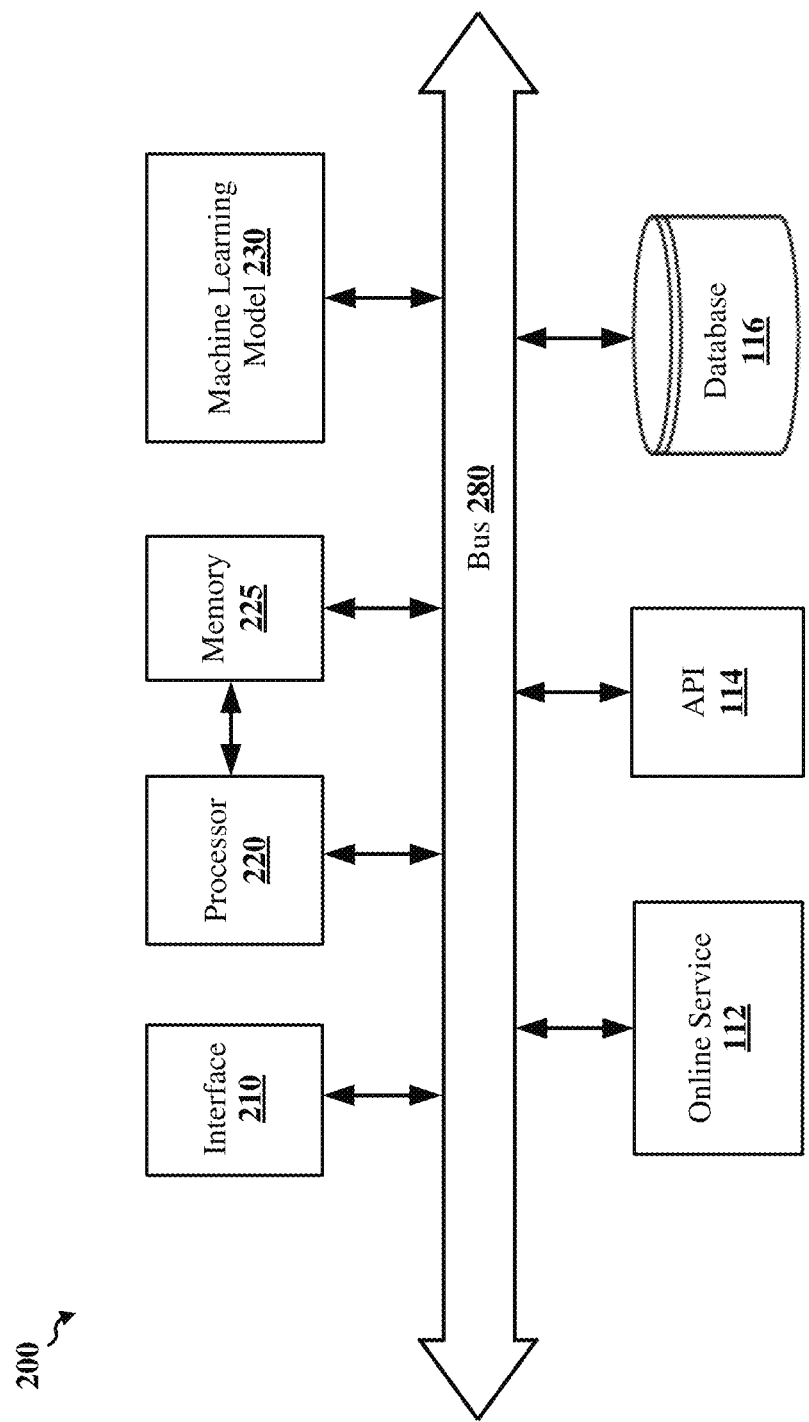
FIG. 2 shows an example system for processing information exchanged between or on behalf of vendors and consumers, according to some implementations.

FIG. 2 shows a block diagram of another example system 200 for selectively advancing funds based on risks posed by transactions associated with an online service, according to some implementations. The system 200, which may be one example of the system 110 of FIG. 1, includes the online service 112, the API 114, and the database 116 described with reference to FIG. 1, and also includes an interface 210, a processor 220, a memory 225 coupled to the processor 220, and a machine learning model 230. The various components of the system 200 may be connected to one another by a data bus 280, as depicted in the example of FIG. 2. In other implementations, the various components of the system 200 may be connected to one another using other suitable signal routing resources. As described with reference to the system 110 of FIG. 1, the system 200 can assess risks posed to the online service 112 by transactions processed on behalf of the vendors 120, and can generate a risk score indicative of the level of risk posed by such transactions. In some implementations, the system 200 can detect fraudulent transactions and/or fraudulent activities involving collusion between the vendors 120 and their consumers 130, and can assess the risks posed by such collusion.

The interface 210 may be one or more input/output (I/O) interfaces to receive input data that can be used to generate risk scores for transactions and other information exchanges processed by the online service 112. The interface 210 may also be used to provide risk scores and other signals or data generated by the system 200 to one or more external components (such as a user, a vendor 120, a consumer 130, a third-party service 140, or a financial service 150). The interface 210 may also be used to provide or receive other suitable information, such as computer code for updating one or more programs stored on the system 200, internet protocol requests and results, or results from the machine learning model 230. In some aspects, the interface 210 may include a screen, an input device, and other suitable elements that allow a user, resource, or other system (not shown for simplicity) to provide information to the system 200 or to retrieve information from the system 200.

The data processor 220, which may be used for general data processing operations (such as manipulating the datasets stored in the database 116), may be one or more suitable processors capable of executing scripts or instructions of one or more software programs stored in the system 200 (such as within the memory 225). The data processors 220 may be implemented with a general-purpose single-chip or multi-chip processor, a graphics processing unit (GPU), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 220 may be implemented as a combination of computing devices (such as a combination of a DSP and a microprocessor, a plurality of microprocessors, one or more microprocessors in conjunction with a DSP core, or any other such configuration).

The memory 225, which may be any suitable persistent memory (such as non-volatile memory) may store any number of software programs, executable instructions, machine code, algorithms, and the like that can be executed by the data processors 220 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The machine learning model 230 can employ one or more machine learning algorithms based on decision trees, random forests, logistic regression, nearest neighbors, classification trees, control flow graphs, support vector machines, naïve Bayes, Bayesian Networks, value sets, hidden Markov models, neural networks, or any combination thereof that can be configured to determine a risk score for transactions processed on behalf of vendors 120 by the online service 112. The machine learning model 230 can include any suitable number of machine learning engines, and can take the form of an extensible data structure that represents sets of attributes, features, or characteristics of the vendors and consumer. In some implementations, the machine learning model 230 generates the risk score by applying one or more risk assessment rules to input data indicative of various characteristics and features of the vendor 120 and consumer 130. For example, in some instances, the historical transactions of the vendor 120, the personal attributes of the vendor 120, credit information of the consumer 130, and/or the personal attributes of the consumer 130 are aggregated into the structured data set provided as input data to the machine learning model 230.

In some instances, the machine learning model 230 may be a recurrent neural network (RNN). Although not shown in FIG. 2 for simplicity, the RNN uses an influence of prior information to determine the risks associated with transactions based on current information. For example, instead of a purely feed forward neural network, an RNN may include a feedback loop between nodes or layers or other means for prior outputs of a node or layer to impact a current output of a node or layer. In some aspects, the RNN is an artificial neural network including a plurality of nodes configured for obtaining prior outputs of nodes and connected to form a directed graph along a temporal sequence.

The machine learning model 230 can be trained using historical transactions associated with the vendors 120, personal attributes of the vendors 120, credit information of the consumers 130, personal attributes of the consumers 130, or any combination thereof, either with supervision or without supervision. In some instances, the machine learning model 230 can be iteratively trained using pairs of structured data sets and associated risk scores. In some other instances, the machine learning model 230 can be updated or modified based on more detailed investigations of certain transactions or vendor behaviors conducted by human risk analysts.

In some instances, the machine learning model 230 can be trained to determine whether certain characteristics or features of the vendors 120 are accurate predictors of risky transactions, and can apply greater weightings to these vendor characteristics or features when determining the risk score. The machine learning model 230 can also be trained to determine whether certain characteristics or features of the consumer 130 are accurate predictors of risky transactions, and can apply greater weightings to these consumer characteristics or features when determining the risk score.

The particular architecture of the system 200 shown in FIG. 2 is but one example of a variety of different architectures within which aspects of the present disclosure may be implemented. For example, in other implementations, the system 200 may not include the machine learning model 230, the functions of which may be implemented by the processors 220 executing instructions or scripts stored in the memory 225.

Figure 3:
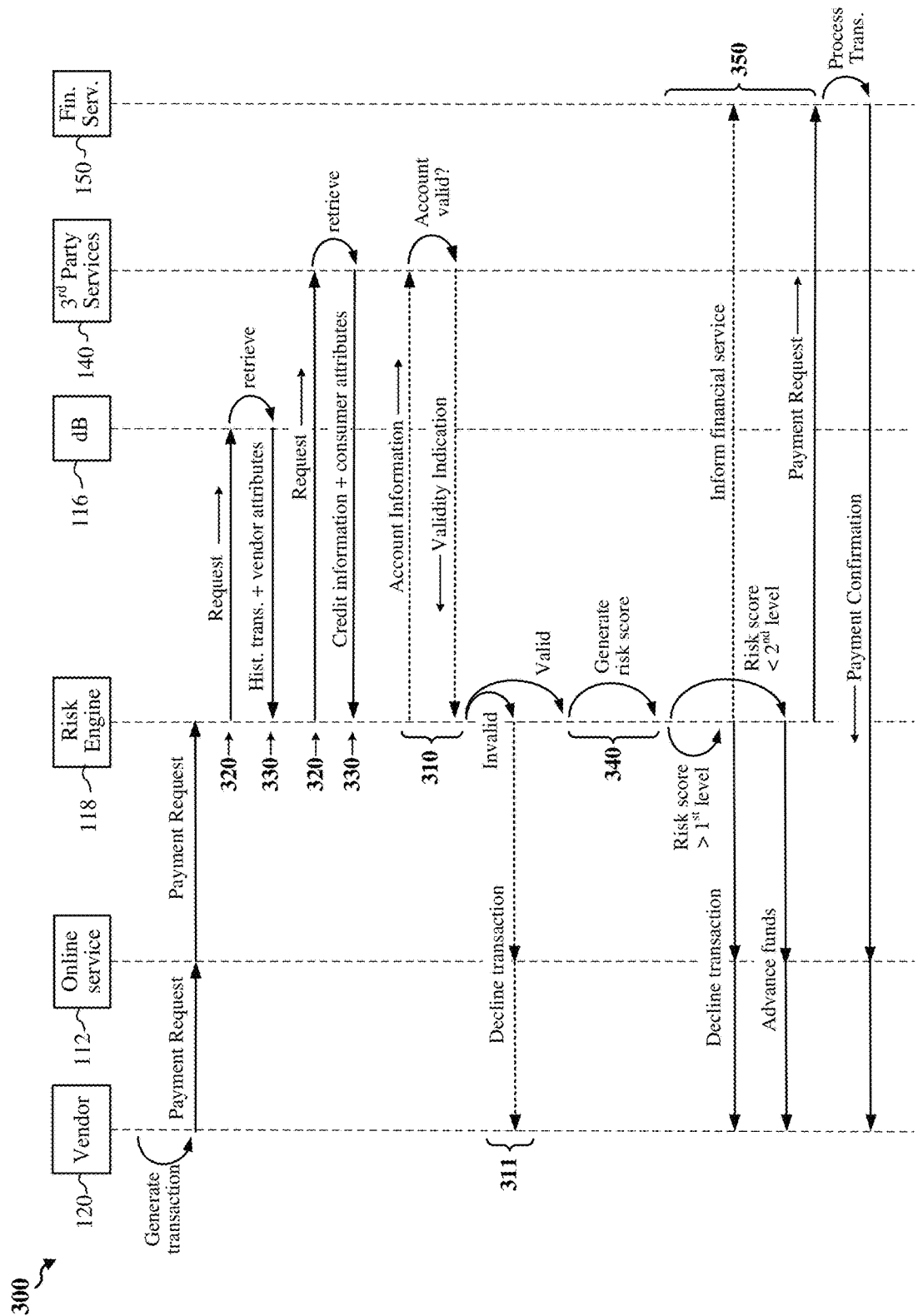
FIG. 3 shows a sequence diagram depicting an example operation for selectively advancing funds based on risks posed by transactions associated with an online service, according to some implementations.

FIG. 3 shows an example sequence diagram depicting an example operation 300 for selectively advancing funds based on risks posed by transactions associated with an online service, according to some implementations. The operation 300 begins when a vendor completes a purchase of goods and/or services to a consumer, generates a transaction for the purchase, and sends a payment request for the transaction to the online service 112. In some instances, the vendor uses a browser executing on a vendor terminal to access the online service 112 and send the payment request to the online service 112. In some aspects, the online service 112 may be an online payment platform such as Quickbooks Online.

The payment request includes transaction data such as the purchase amount, a transaction ID that uniquely identifies the purchase or transaction, and payment information indicating the manner in which the consumer is paying for the purchase. As discussed, the payment information may designate one of the financial services 150 from which the purchase amount is to be paid. For example, when the consumer pays for the purchased goods or services via payment card, the payment information can include the account number, expiration date, security code, and/or PIN of the payment card. For another example, when the consumer pays for the purchased goods or services via ACH, the payment information can indicate the bank designated by the consumer, the routing number of the designated bank, the consumer's bank account number, and/or the type of bank account (e.g., checking or savings). In some instances, the payment request also includes a consumer ID that uniquely identifies the consumer.

At 310, the API 114 receives the payment request, and the extracts or parses the payment information from the payment request. The API 114 forwards the payment information to the online service 112 and to the risk assessment engine 118. In accordance with various aspects of the present disclosure, the online service 112 does not forward the payment request to the designated financial service 150 unless an indication to do is received from the risk assessment engine 118.

At 320, the risk assessment engine 118 sends a first request to the database 116 to provide historical transactions and personal attributes of the vendor, and at the same time, sends a second request to one or more of the third-party systems 140 to provide credit information and personal attributes of the consumer. In some instances, the risk assessment engine 118 may also query the database 116 for personal attributes of the consumer and/or query the third-party services 140 for credit information and/or the personal attributes of the vendor.

At 330, the database 116 sends the historical transactions and personal attributes of the vendor to the risk assessment engine 118 in response to the first request. As discussed, the historical transactions can be obtained by storing previous transactions associated with the vendor in the database 116, along with any corresponding risk scores, and a mapping to one or more personal attributes of the vendor associated with the previous transactions (e.g., the IP address and device ID used to access the online service 112 to process the previous transactions). The personal attributes of the vendor may include (but are not limited to) a phone number, an email address, a mailing address, a device ID of the transaction terminal 122, a type of browser used by the vendor to access the online service 112, or any combination thereof.

Also at 330, one or more of the third-party services 140 send the credit information and/or the personal attributes of the consumer to the risk assessment engine 118 in response to the second request. As discussed, the credit information can be obtained from any number of publicly available resources such as, for example, Experian. The personal attributes of the consumer may include (but are not limited to) a phone number, an email address, and a mailing address of the consumer. The personal attributes of the consumer (and vendor, if requested) can be obtained from any number of publicly available sources such as, for example, Lexis/Nexis, D&B, and ThreadMetrics.

In some implementations, dynamic pre-fetching techniques can be used that allow the risk assessment engine 118 to request specific information from one or more of the third-party services 140. For example, if the risk assessment engine 118 has the credit score of a consumer but not the credit history, the risk assessment engine 118 can query Experian for only the credit history of the consumer (e.g., rather than requesting an entire credit report), which can reduce costs associated with obtaining information from the third-party services 140.

At 310, the risk assessment engine 118 can verify the validity of the consumer's payment information at any time during the operation 300. When the consumer pays via payment card, the risk assessment engine 118 sends the account number, expiration date, and security code, along with a verification request, to GIACT. In response thereto, GIACT compares the account number, expiration date, and security code with entries in a database storing valid combinations of account numbers, expiration dates, and security codes to determine whether the consumer's payment account is valid. When the consumer pays via ACH, the risk assessment engine 118 sends the bank name, account number, and routing number to GIACT (and in some other aspects, also sends the account type). In response thereto, GIACT compares the bank name, account number, and routing number with entries in a database storing valid combinations of bank names, account numbers, and routing numbers to determine whether the consumer's bank account is valid. In some aspects, GIACT may also indicate the amount of available cash or credit associated with the consumer's account. In either case, GIACT sends an indication of whether or not the consumer's payment account is a valid account to the API 114, which forwards the validity indication to the risk assessment engine 118 and the online service 112.

If the consumer's payment account is invalid or fraudulent, the online service 112 declines the transaction, and notifies the vendor of the declined transaction, at 311. Conversely, if the consumer's payment account is valid, the risk assessment engine 118 generates a risk score for the transaction. As discussed, the risk score can indicate a level or degree of risk posed to the online service 112 by the transaction. Thus, in some aspects, the risk score may indicate a level of financial risk associated with the transaction. In other aspects, the risk score may indicate a level of risk of fraudulent activity associated with the transaction.

In some instances, the risk assessment engine 118 verifies the validity of the consumer's payment information upon receiving the payment request from the vendor via the API 114 before sending any payment request to the designated financial service 150. By sending the payment request to the designated financial service 150 after confirming that the consumer's account is valid, the risk assessment engine 118 minimizes the number of fraudulent payment requests it sends to the designated financial service 150. In addition, when GIACT determines that the consumer's payment information does not correspond to a valid account, the risk assessment engine 118 may cause the online service 112 to more quickly decline the transaction (e.g., compared with sending a payment request to the financial service and waiting for a response), which in turn may inhibit any fraudulent activity associated with the declined transaction. In other instances, the risk assessment engine 118 can verify the validity of the consumer's payment information at other suitable instances during the operation 300.

At 340, the system 110 aggregates the historical transactions and personal attributes of the vendor with the credit information and personal attributes of the consumer into a structured data set. The structured data set is provided to the risk assessment engine 118, which generates the risk score for the transaction based on the historical transactions of the vendor, the personal attributes of the vendor, the credit information of the consumer, and/or the personal attributes of the consumer embodied in the structured data set. In some implementations, the risk assessment engine 118 generates the risk score using the machine learning model 230 to apply the risk assessment rules to the structured data set. The machine learning model 340 is trained with at least the historical transactions and the personal attributes of the vendor, either with or without supervision. In some instances, the machine learning model 340 is also trained using the credit information and/or the personal attributes of the consumer.

At 350, the risk assessment engine 118 determines whether or not to advance funds to the vendor for the transaction, prior to sending any payment request to the designated financial service 150, based at least in part on the risk score. In some implementations, the risk assessment engine 118 compares the risk score with different threshold levels to normalize the risk score relative to one or more actions taken by the online service 112. For example, in some instances, a first level may be selected such that risk scores greater than the first level are associated with an unacceptable level of risk, and a second level may be selected such that risk scores less than the second level are associated with an acceptable level of risk. Specifically, when a risk score is greater than the first level, the risk assessment engine 118 deems the transaction to have an unacceptable level of risk, and causes the online service 112 to decline the transaction. The online service 112 declines the transaction without sending any payment request to the designated financial service 150, and notifies the vendor of the declined transaction. The risk assessment engine 118 may store the transaction data and the declined transaction indication in the database 116 as a historical transaction. In some instances, the risk assessment engine 118 may also store the personal attributes of the consumer, the credit information of the consumer, the credit information of the vendor, or the personal attributes of the vendor, along with the transaction data and declined transaction indication, in the database 116.

Conversely, when the risk score is less than the second level, the risk assessment engine 118 deems the transaction to have an acceptable level of risk, and causes the online service 112 to send the payment request to the designated financial service 150. In response thereto, the financial service 150 processes the transaction, for example, by transferring funds of the purchase amount to the online service 112 from the consumer's payment account, and sends a payment confirmation to the risk assessment engine 118 and the online service 112 via the API 114. The online service 112 sends the payment confirmation to the vendor, and in some instances, deposits the funds into an account designated by the vendor (e.g., at one of the financial services 150). The risk assessment engine 118 may store the transaction data and the payment confirmation in the database 116 as a historical transaction. In some instances, the risk assessment engine 118 may also store the personal attributes of the consumer, the credit information of the vendor, the credit information of the consumer, and/or the personal attributes of the vendor, along with the transaction data and payment confirmation, in the database 116.

In some aspects, the risk assessment engine 118 may, depending on the amount or percentage that the risk score exceeds the first level, inform the designated financial service 150 of the declined transaction. In this way, the risk assessment engine 118 may assist the financial service 150 in its ability to detect risky and/or fraudulent transactions. In addition, or in the alternative, the risk assessment engine 118 may, depending on the amount or percentage by which the risk score is less than the second level, advance funds to the vendor for payment of the transaction prior to or concurrently with sending the payment request to the consumer's account at the designated financial service 150. In this way, the online service 112 can ensure that the vendor is paid for the consumer's purchase almost immediately (e.g., without waiting for approval or authorization from the vendor's receivables account) while incurring minimal risk associated with the transaction.

Figure 4:
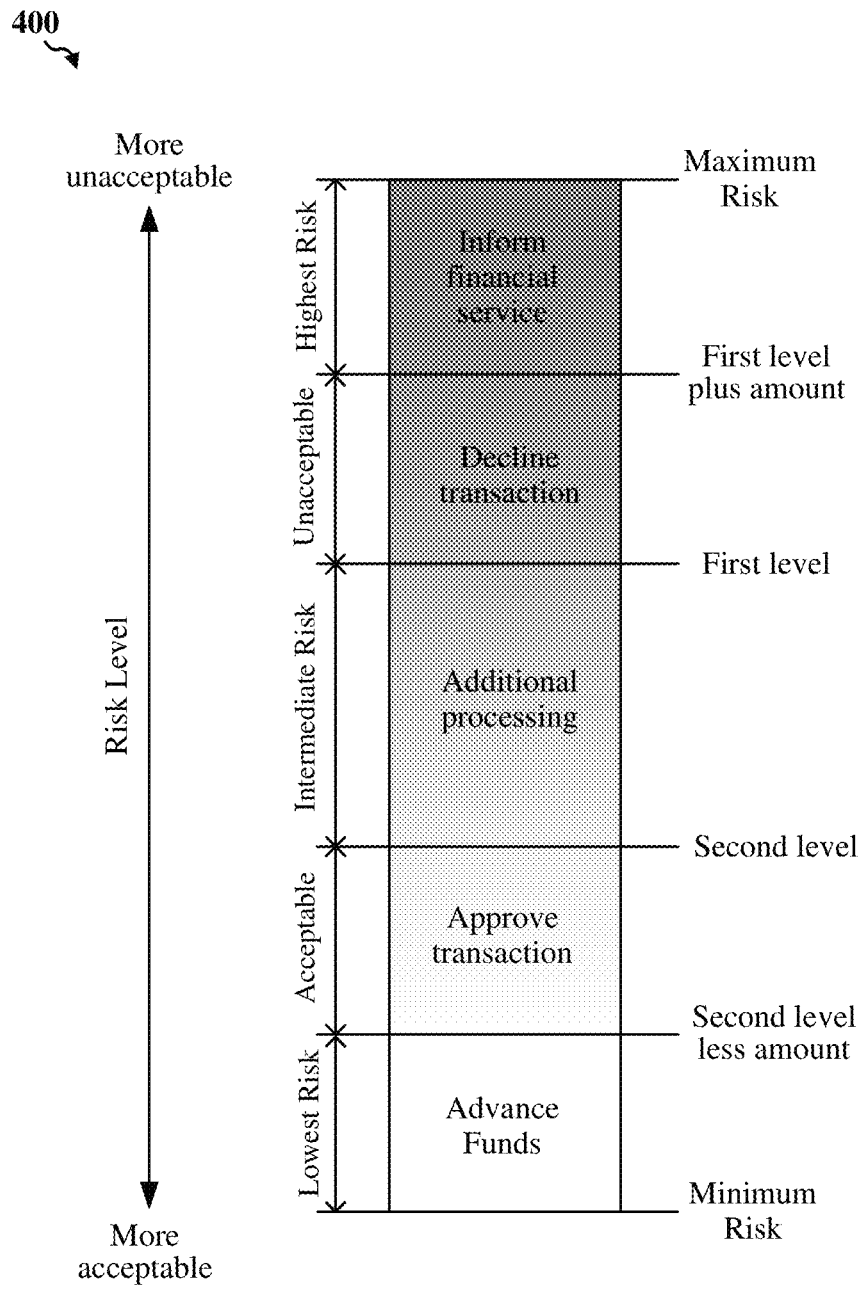
FIG. 4 shows an example relationship between risk scores determined by the system and actions taken by the system, according to some implementations.

FIG. 4 shows an example relationship 400 between risk scores actions taken by the system 110, according to some implementations. As discussed, the risk assessment engine 118 may compare the risk score with different threshold levels to normalize the risk score. In some implementations, the risk assessment engine 118 may compare the risk score with four different thresholds, as depicted in the example of FIG. 4. Specifically, if the risk score is greater than the first level, which indicates an unacceptable level of risk, the online service 112 declines the transaction (without necessarily informing the designated financial service 150). Then, if the risk score is greater than the first level by more than an amount or percentage, which indicates a heightened level of risk, the online service 112 not only declines the transaction but also informs the designated financial service 150 of the declined transaction.

Conversely, when the risk score is less than the second level, which indicates an acceptable level of risk, the online service 112 sends the payment request to the designated financial service 150 for processing. Then, if the risk score is less than the second level by more than an amount or percentage, which indicates a minimal level of risk, the online service 112 advances funds to the vendor 120 for the transaction prior to or concurrently with sending the payment request to the designated financial service 150. Accordingly, when the financial risk posed by a transaction between a vendor and a consumer is determined to be minimal (e.g., less than the second level by more than the amount or percentage), the risk assessment engine 118 allows the online service 112 to pay the vendor for the transaction on behalf of the consumer before reimbursement from the financial service designated by the consumer. In this way, the vendors 120 can be paid for purchases made by the consumers 130 without waiting for approval from the financial services 150 (e.g., almost immediately).

When the risk score is between the first and second levels, indicating that the corresponding transaction has not been classified as acceptable or unacceptable, the risk assessment engine 118 can perform additional processing to determine the appropriate action to take. In some instances, the risk assessment engine 118 may send the payment request to the designated financial service 150 (without advancing funds to the vendor), thereby allowing the designated financial service 150 to determine whether to process the transaction. In other instances, the risk assessment engine 118 may update the structured data set to include additional input data (e.g., credit information of the vendor, additional personal attributes of the vendor, additional personal attributes of the consumer, etc.), and then generate another risk score based on the updated structured data set.

In some implementations, the risk assessment engine 118 can employ the machine learning model 230 of FIG. 2 to determine a correlation between the personal attributes of the consumer and the personal attributes of the vendor, and then determine a likelihood of fraudulent activity involving the vendor and the consumer based at least in part on the determined correlation. The correlation can be based at least in part on commonalities between the phone numbers of the vendor and the consumer, commonalities between email addresses of the vendor and the consumer, and/or commonalities between the mailing addresses of the vendor and the consumer.

In addition, or in the alternative, the risk assessment engine 118 can combine a plurality of structured data sets corresponding to a plurality of transactions between the vendors and consumers into a single thread, and then concurrently obtain risk scores for each of the plurality of transactions based on the application of the one or more risk assessment rules to the single thread by the trained machine learning model 230. In some instances, the plurality of transactions may correspond to the same vendor and consumer. In other instances, the plurality of transactions may correspond to the same vendor and different consumers. In some other instances, the plurality of transactions may correspond to different vendors. The ability to obtain risk scores for a plurality of transactions at the same time can increase the throughput of the system, for example, as compared with implementations in which the risk assessment engine generates each risk score individually.

Figure 5:
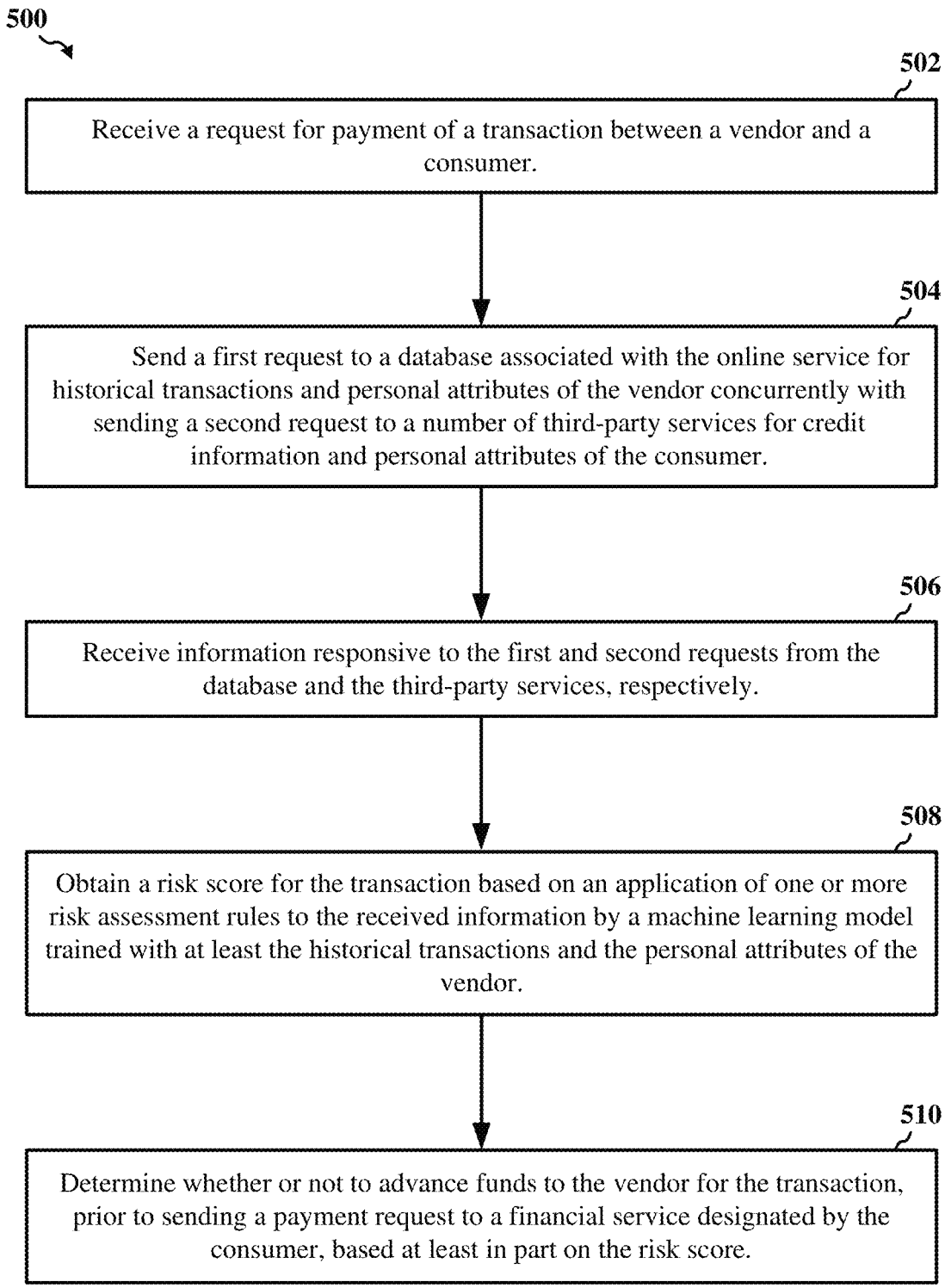
FIG. 5 shows an illustrative flowchart depicting an example operation for selectively advancing funds based on risks posed by transactions associated with an online service, according to some implementations.

FIG. 5 shows an illustrative flowchart depicting an example operation 500 for selectively advancing funds based on risks posed by transactions associated with an online service, according to some implementations. The operation 500 may be performed by one or more processors of the system 110 of FIG. 1, or by the machine learning model 230 of FIG. 2. In various implementations, some or all of the operation 500 can be performed by the risk assessment engine 118 of FIG. 1.

At block 502, the system receives a request for payment of a transaction between a vendor and a consumer. At block 504, the system sends a first request to a database associated with the online service for historical transactions and personal attributes of the vendor concurrently with sending a second request to a number of third-party services for credit information and personal attributes of the consumer. At block 506, the system receives information responsive to the first and second requests from the database and the third-party services, respectively. At block 508, the system obtains a risk score for the transaction based on an application of one or more risk assessment rules to the received information by a machine learning model trained with at least the historical transactions and the personal attributes of the vendor. At block 510, the system determines whether or not to advance payment to the vendor for the financial transaction, prior to sending a payment request to a financial service designated by the consumer, based at least in part on the risk score. In some implementations, the historical transactions and personal attributes of the vendor can be aggregated with the credit information and personal attributes of the consumer into a structured data set, and the structured data set can be provided as the received information to the machine learning model. In some instances, the machine learning model may be further trained using at least the credit information of the consumer.

The personal attributes of the consumer may include a phone number of the consumer, an email address of the consumer, a mailing address of the consumer, or any combination thereof. The personal attributes of the vendor may include a phone number of the vendor, an email address of the vendor, a mailing address of the vendor, a device ID of a transaction terminal associated with the vendor, a type of browser used by the vendor to access the electronic system, or any combination thereof.

In one implementation, sending the second request to the one or more third-party systems includes providing a consumer account number and a routing number of the bank or financial service associated with the consumer to the one or more third-party systems, and the information provided by the one or more third-party systems indicates whether the consumer's account is valid based on a comparison between the consumer account number and routing number of the consumer and a database of valid pairs of consumer accounts number and routing numbers.

Figure 6A:
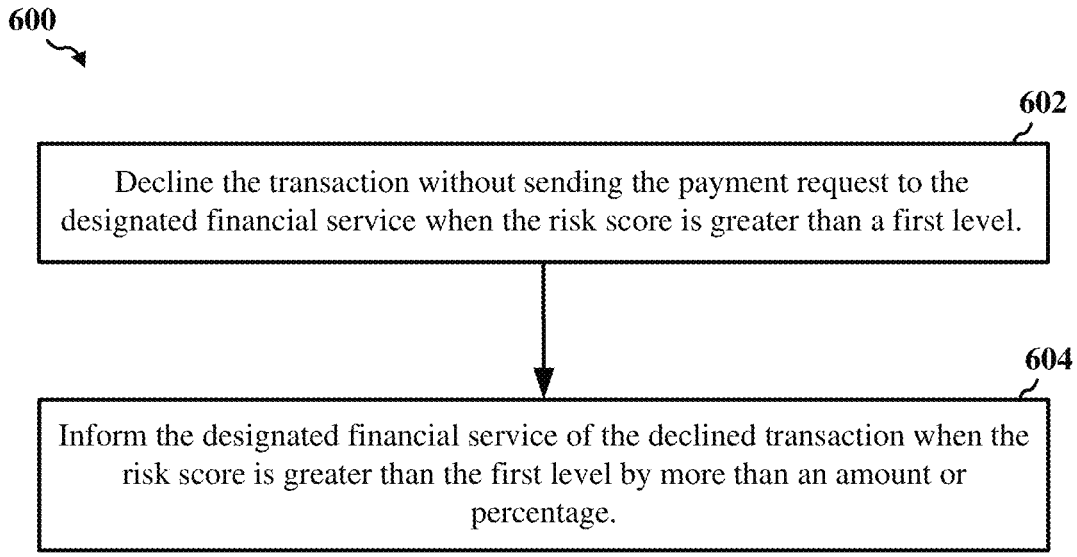
FIGS. 6A-6B show illustrative flowcharts depicting example operations for selectively advancing funds based on risks posed by transactions associated with an online service, according to some implementations.

FIG. 6A shows an illustrative flowchart depicting an example operation for selectively advancing funds based on risks posed by transactions associated with an online service, according to some implementations. The operation 600 may be performed by one or more processors of the system 110 of FIG. 1, or by the machine learning model 230 of FIG. 2. In various implementations, some or all of the operation 600 can be performed by the risk assessment engine 118 of FIG. 1. In some instances, the operation 600 may be performed after obtaining the risk score in block 512 of FIG. 5. For example, at block 602, the system declines the transaction without sending the payment request to the designated financial service when the risk score is greater than a first level. At block 604, the system informs the designated financial service of the declined transaction when the risk score is greater than the first level by more than an amount or percentage.

Figure 6B:
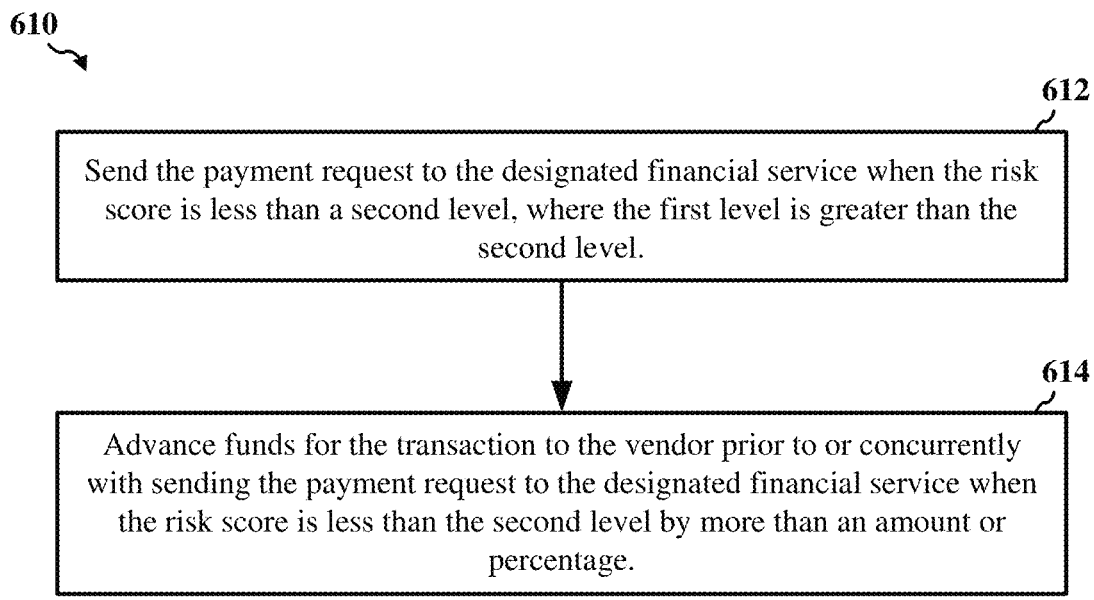

FIG. 6B shows an illustrative flowchart depicting an example operation 610 for selectively advancing funds based on risks posed by transactions associated with an online service, according to some implementations. The operation 610 may be performed by one or more processors of the system 110 of FIG. 1, or by the machine learning model 230 of FIG. 2. In various implementations, some or all of the operation 610 can be performed by the risk assessment engine 118 of FIG. 1. In some instances, the operation 610 may be performed after obtaining the risk score in block 512 of FIG. 5. For example, at block 612, the system sends the payment request to the designated financial service when the risk score is less than a second level, where the first level is greater than the second level. At block 614, the system advances funds for the transaction to the vendor prior to or concurrently with sending the payment request to the designated financial service when the risk score is less than the second level by more than an amount or percentage.

Figure 7A:
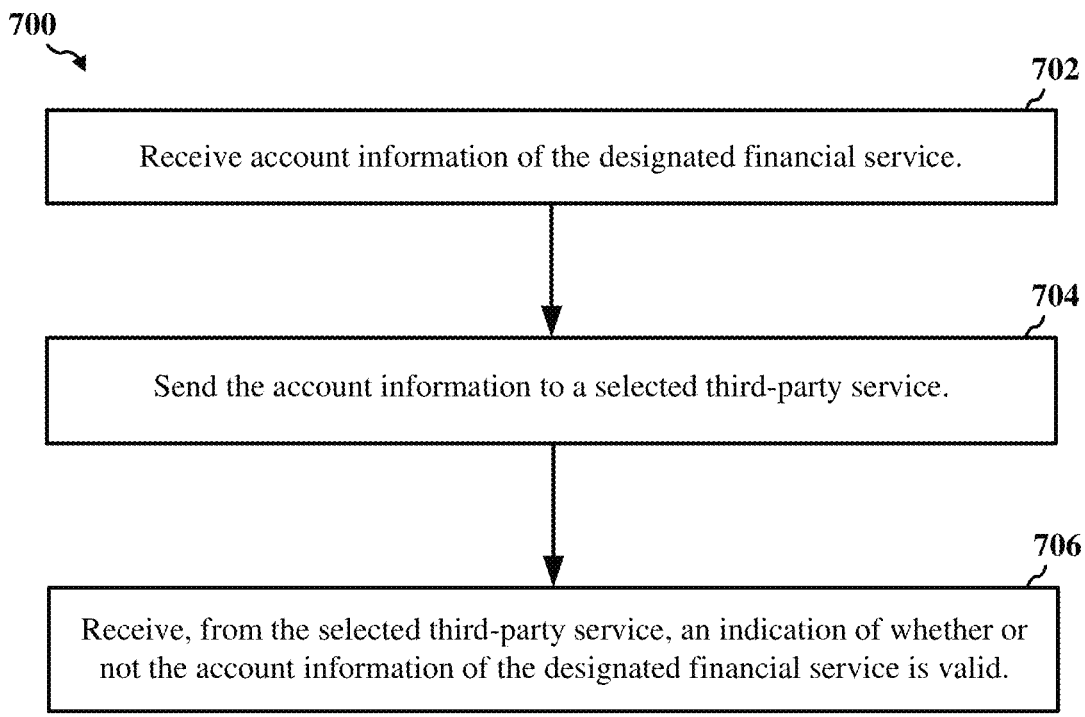
FIGS. 7A-7B show illustrative flow charts depicting example operations for assessing risks posed by transactions associated with an online service, according to other some implementations.

FIG. 7A shows an illustrative flowchart depicting an example operation 700 for selectively advancing funds based on risks posed by transactions associated with an online service, according to some implementations. The operation 700 may be performed by one or more processors of the system 110 of FIG. 1, or by the machine learning model 230 of FIG. 2. In various implementations, some or all of the operation 700 can be performed by the risk assessment engine 118 of FIG. 1. The operation 700 may be performed at any time during the operation 500 of FIG. 5. For example, at block 702, the system receives account information of the designated financial service. At block 704, the system sends the account information to a selected third-party service. At block 706, the system receives, from the selected third-party service, an indication of whether or not the account information of the designated financial service is valid.

Figure 7B:
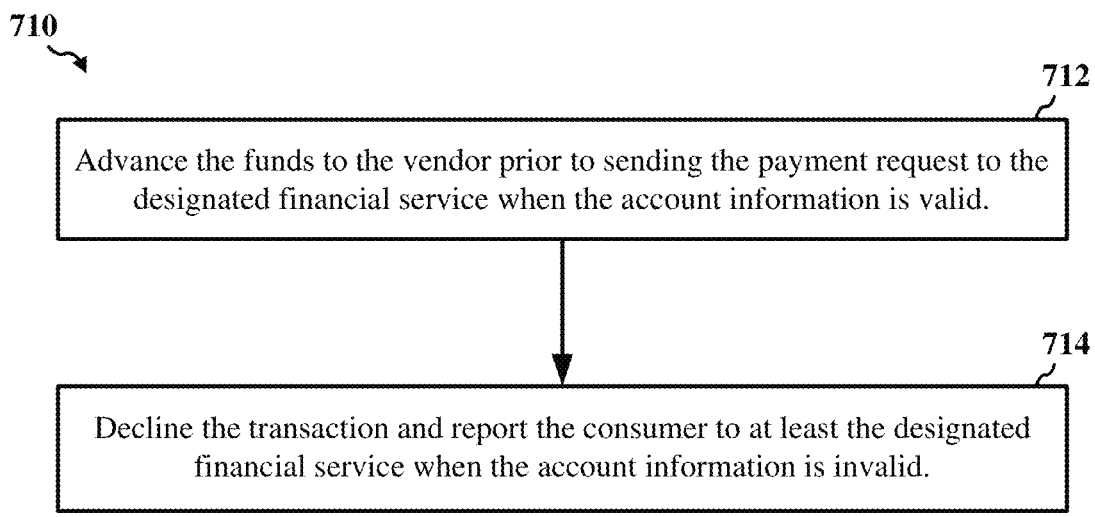

FIG. 7B shows an illustrative flowchart depicting an example operation 710 for selectively advancing funds based on risks posed by transactions associated with an online service, according to some implementations. The operation 710 may be performed by one or more processors of the system 110 of FIG. 1, or by the machine learning model 300 of FIG. 3. The operation 710 may be performed at any time during the operation 500 of FIG. 5. For example, at block 712, the system advances the funds to the vendor prior to sending the payment request to the designated financial service when the account information is valid. At block 714, the system declines the transaction and reports the consumer to at least the designated financial service when the account information is invalid. In some aspects, the system also reports the consumer to law enforcement agencies when the account information is invalid.

Figure 8A:
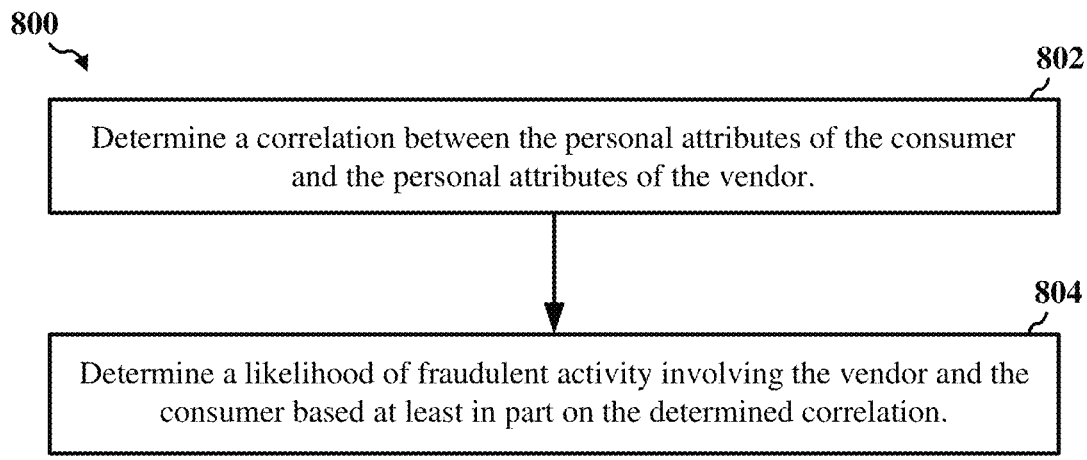
FIGS. 8A-8B show illustrative flow charts depicting example operations for selectively advancing funds based on risks posed by transactions associated with an online service, according to some implementations.

FIG. 8A shows an illustrative flowchart depicting an example operation 800 for selectively advancing funds based on risks posed by transactions associated with an online service, according to some other implementations. The operation 800 may be performed by one or more processors of the system 110 of FIG. 1, or by the machine learning model 230 of FIG. 2. In various implementations, some or all of the operation 800 can be performed by the risk assessment engine 118 of FIG. 1. The operation 800 may be performed at any time during the operation 500 of FIG. 5. For example, at block 802, the system determines a correlation between the personal attributes of the consumer and the personal attributes of the vendor. At block 804, the system determines a likelihood of fraudulent activity involving the vendor and the consumer based at least in part on the determined correlation. The correlation can be based at least in part on commonalities between the phone numbers of the vendor and the consumer, commonalities between email addresses of the vendor and the consumer, and commonalities between the mailing addresses of the vendor and the consumer.

Figure 8B:
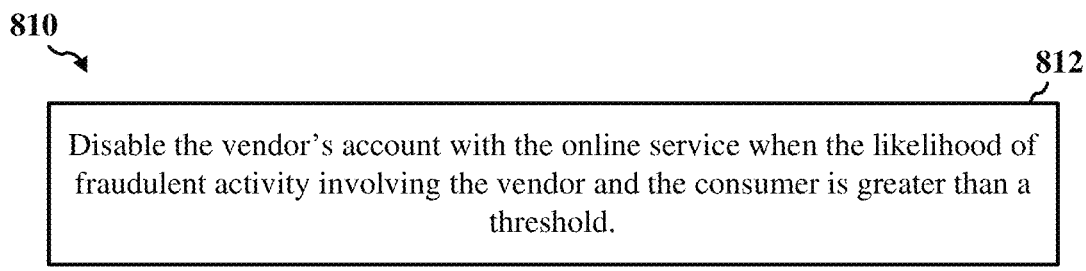

FIG. 8B shows an illustrative flowchart depicting another example operation 810 for selectively advancing funds based on risks posed by transactions associated with an online service, according to some other implementations. The operation 810 may be performed by one or more processors of the system 110 of FIG. 1, or by the machine learning model 230 of FIG. 2. In various implementations, some or all of the operation 810 can be performed by the risk assessment engine 118 of FIG. 1. The operation 810 may be performed at any time during the operation 500 of FIG. 5. For example, at block 812, the system disables the vendor's account with the online service when the likelihood of fraudulent activity involving the vendor and the consumer is greater than a threshold.

Figure 9:
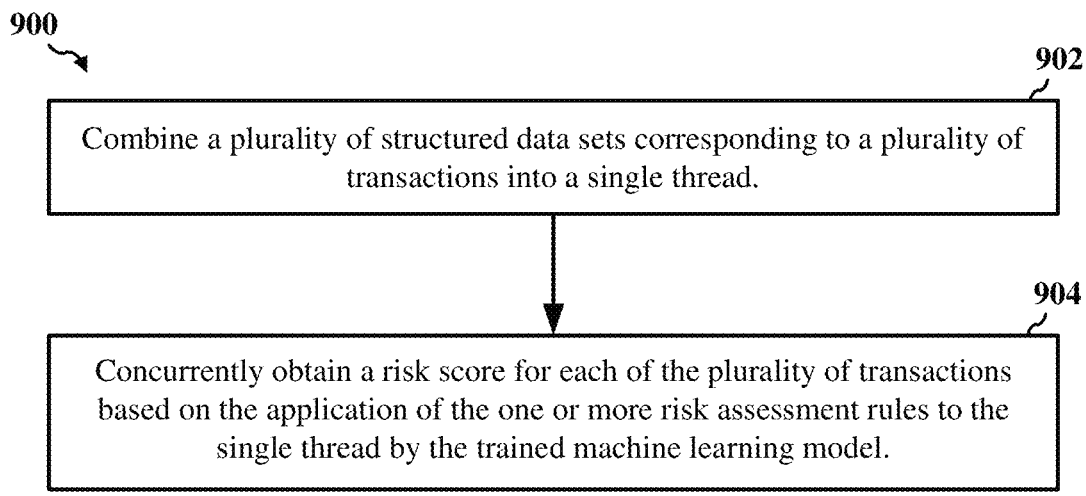
FIG. 9 shows an illustrative flow chart depicting an example operation for selectively advancing funds based on risks posed by transactions associated with an online service, according to some other implementations.

FIG. 9 shows an illustrative flowchart depicting another example operation 900 for selectively advancing funds based on risks posed by transactions associated with an online service, according to some other implementations. The operation 900 may be performed by one or more processors of the system 110 of FIG. 1, or by the machine learning model 230 of FIG. 2. The operation 900 may be performed at any time during the operation 500 of FIG. 5. As discussed, in some implementations, the historical transactions and personal attributes of the vendor can be aggregated with the credit information and personal attributes of the consumer into a structured data set, and the structured data set can be provided as the received information to the machine learning model.

For example, at block 902, the system combines a plurality of structured data sets corresponding to a plurality of transactions into a single thread. At block 904, the system concurrently obtains a risk score for each of the plurality of transactions based on the application of the one or more risk assessment rules to the single thread by the trained machine learning model. In some instances, the plurality of transactions may correspond to the same vendor and consumer. In other instances, the plurality of transactions may correspond to the same vendor and different consumers. In some other instances, the plurality of transactions may correspond to different vendors. The ability to obtain risk scores for a plurality of transactions at the same time can increase the throughput of the system, for example, as compared with implementations in which the risk assessment engine generates each risk score individually.

As used herein, a phrase referring to "at least one of" a list of items refers to any combination of those items, including single members. As an example, "at least one of: a, b, or c" is intended to cover: a, b, c, a-b, a-c, b-c, and a-b-c.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for selectively advancing funds based on risks posed by transactions associated with an online service, the method performed by one or more processors of a system coupled to the online service and comprising:
    receiving, for each of a plurality of transactions, a request for payment of the transaction between a vendor and a consumer;
    sending, for each of the plurality of transactions, a first request to a database associated with the online service for historical transactions and personal attributes of the vendor concurrently with sending a second request to a number of third-party services for credit information and personal attributes of the consumer;
    receiving, for each of the plurality of transactions, information responsive to the first and second requests from the database and the third-party services, respectively;
    aggregating, for each of the plurality of transactions, the historical transactions and personal attributes of the vendor with the credit information and personal attributes of the consumer into a respective structured data set;
    combining a plurality of structured data sets corresponding to the plurality of transactions into a single thread;
    concurrently obtaining a respective risk score for each of the plurality of transactions based on an application of one or more risk assessment rules to the single thread by a machine learning model trained with at least the historical transactions and the personal attributes of at least one vendor associated with the plurality of transactions and the credit information of at least one consumer associated with the plurality of transactions and the at least one vendor associated with the plurality of transactions;
    determining, for each of the plurality of transactions, whether or not to advance funds to the vendor for the transaction, prior to sending a payment request to a financial service designated by the consumer, based at least in part on the respective risk score; and
    training the machine learning model with at least a plurality of pairs of structured data sets and risk scores, each pair comprising the structured data set and the risk score for a respective transaction of the plurality of transactions.

2. The method of claim 1, further comprising, for each of the plurality of transactions:
    declining the transaction without sending the payment request to the designated financial service when the respective risk score is greater than a first level; and
    informing the designated financial service of the declined transaction when the respective risk score is greater than the first level by more than an amount or percentage.

3. The method of claim 2, further comprising, for each of the plurality of transactions:
    sending the payment request to the designated financial service when the respective risk score is less than a second level, wherein the first level is greater than the second level; and
    advancing funds for the transaction to the vendor prior to or concurrently with sending the payment request to the designated financial service when the respective risk score is less than the second level by more than an amount or percentage.

4. The method of claim 1, further comprising, for each of the plurality of transactions:
    receiving account information of the designated financial service;
    sending the account information to a selected third-party service; and
    receiving, from the selected third-party service, an indication of whether or not the account information of the designated financial service for the first transaction is valid.

5. The method of claim 4, wherein:
    the designated financial service is a bank, and the account information includes an account number and routing number of the bank; or
    the designated financial service is a credit card company, and the account information includes an account number, an expiration date, and a security code of the credit card.

6. The method of claim 4, wherein determining whether or not to advance the funds to the vendor includes:
    advancing the funds to the vendor prior to sending the payment request to the designated financial service when the account information is valid; and
    declining the transaction and reporting the consumer to at least the designated financial service when the account information is invalid.

7. The method of claim 1, wherein:
    the personal attributes of the consumer includes a phone number of the consumer, an email address of the consumer, a mailing address of the consumer, or any combination thereof; and
    the personal attributes of the vendor includes a phone number of the vendor, an email address of the vendor, a mailing address of the vendor, a device ID of a transaction terminal associated with the vendor, a type of browser used by the vendor to access the online service, or any combination thereof.

8. The method of claim 7, further comprising, for each transaction of the plurality of transactions:

determining a correlation between the personal attributes of the consumer and the personal attributes of the vendor; and determining a likelihood of fraudulent activity involving the vendor and the consumer based at least in part on the determined correlation.

9. The method of claim 8, further comprising:
disabling the vendor's account with the online service when the likelihood of fraudulent activity involving the vendor and the consumer is greater than a threshold.

10. The method of claim 1, wherein:
the credit information of the consumer includes a credit score of the consumer, a credit history of the consumer, an amount of credit available to the consumer, a length of credit history of the consumer, credit defaults associated with the consumer, bankruptcy of the consumer, a number of missed or insufficient payments by the consumer during the time period, or any combination thereof; and the credit information of the vendor includes a credit score of the vendor, a credit history of the vendor, an amount of credit available to the vendor, a number of chargebacks during a time period, a dollar amount of each chargeback during the time period, an average time period between the chargebacks during the time period, a number of credit card authorization declines associated with the vendor during the time period, or any combination thereof.

11. The method of claim 1, wherein the machine learning model is further trained using the credit information of at least one consumer associated with the plurality of transactions.

12. A system for selectively advancing funds based on risks posed by transactions associated with an online service, the system comprising:
one or more processors; and
a memory coupled to the one or more processors and storing instructions that, when executed by the one or more processors, cause the system to:
receive, for each of a plurality of transactions, a request for payment of the transaction between a vendor and a consumer;
send, for each of the plurality of transactions, a first request to a database associated with the online service for historical transactions and personal attributes of the vendor concurrently with sending a second request to a number of third-party services for credit information and personal attributes of the consumer;
receive, for each of the plurality of transactions, information responsive to the first and second requests from the database and the third-party services, respectively;
aggregate, for each of the plurality of transactions, the historical transactions and personal attributes of the vendor with the credit information and personal attributes of the consumer into a respective structured data set;
combine a plurality of structured data sets corresponding to the plurality of transactions into a single thread;
concurrently obtain a respective risk score for each of the plurality of transactions based on an application of one or more risk assessment rules to the single thread by a machine learning model trained with at least the historical transactions and the personal attributes of at least one vendor associated with the plurality of transactions and the credit information of at least one consumer associated with the plurality of transactions and the at least one vendor associated with the plurality of transactions;

determine, for each of the plurality of transactions, whether or not to advance funds to the vendor for the transaction, prior to sending a payment request to a financial service designated by the consumer, based at least in part on the respective risk score; and train the machine learning model with at least a plurality of pairs of structured data sets and risk scores, each pair comprising the structured data set and the risk score for a respective transaction of the plurality of transactions.

13. The system of claim 12, wherein execution of the instructions further causes the system to, for each of the plurality of transactions:
decline the transaction without sending the payment request to the designated financial service when the respective risk score is greater than a first level; and
inform the designated financial service of the declined transaction when the respective risk score is greater than the first level by more than an amount or percentage.

14. The system of claim 13, wherein execution of the instructions further causes the system to, for each of the plurality of transactions:
send the payment request to the designated financial service when the respective risk score is less than a second level, wherein the first level is greater than the second level; and
advance funds for the transaction to the vendor prior to or concurrently with sending the payment request to the designated financial service when the respective risk score is less than the second level by more than an amount or percentage.

15. The system of claim 12, wherein execution of the instructions further causes the system to, for each of the plurality of transactions:
receive account information of the designated financial service;
send the account information of the designated financial service to a selected third-party service; and
receive, from the selected third-party service, an indication of whether or not the account information of the designated financial service is valid.

16. The system of claim 15, wherein:
the designated financial service is a bank, and the account information includes an account number and routing number of the bank; or
the designated financial service is a credit card company, and the account information includes an account number, an expiration date, and a security code of the credit card.

17. The system of claim 15, wherein determining whether or not to advance the funds to the vendor includes:
advancing the funds to the vendor prior to sending the payment request to the designated financial service when the account information is valid; and
declining the transaction and reporting the consumer to at least the designated financial service when the account information is invalid.

* * * * *